United States Patent
Goutay et al.

(10) Patent No.: US 12,316,454 B2
(45) Date of Patent: May 27, 2025

(54) APPARATUSES AND METHODS FOR PROVIDING FEEDBACK

(71) Applicant: NOKIA TECHNOLOGIES OY, Espoo (FI)

(72) Inventors: Mathieu Goutay, Paris (FR); Faycal Ait Aoudia, Saint-Cloud (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 510 days.

(21) Appl. No.: 17/771,261

(22) PCT Filed: Oct. 31, 2019

(86) PCT No.: PCT/EP2019/079805
§ 371 (c)(1),
(2) Date: Apr. 22, 2022

(87) PCT Pub. No.: WO2021/083521
PCT Pub. Date: May 6, 2021

(65) Prior Publication Data
US 2022/0393795 A1     Dec. 8, 2022

(51) Int. Cl.
H04L 1/16       (2023.01)
(52) U.S. Cl.
CPC ...................... H04L 1/16 (2013.01)
(58) Field of Classification Search
CPC ......................................................... H04L 1/16
See application file for complete search history.

(56) References Cited

U.S. PATENT DOCUMENTS

| | | | | |
|---|---|---|---|---|
| 2004/0010743 | A1* | 1/2004 | Lee | H04L 1/005 714/755 |
| 2004/0057530 | A1* | 3/2004 | Tarokh | H04L 1/0625 375/267 |
| 2015/0101003 | A1* | 4/2015 | Bull | H04N 19/147 725/116 |

FOREIGN PATENT DOCUMENTS

| | | |
|---|---|---|
| CN | 104081674 A | 10/2014 |
| CN | 108520450 A | 9/2018 |

(Continued)

OTHER PUBLICATIONS

Notification of the First Office Action dated May 22, 2024 corresponding to Chinese Patent Application No. 2019801019129, with English translation thereof.

(Continued)

*Primary Examiner* — Marisol Figueroa
(74) *Attorney, Agent, or Firm* — Nokia Technologies Oy

(57) ABSTRACT

A retransmission method in a communication system, wherein the communication system comprises at least one transmitter and at least one receiver with a communication channel between the transmitter and the receiver, the method comprising: utilising in the transmitter a transmitter algorithm with trainable weights and in the receiver a receiver algorithm with trainable weights; generating (302) by the transmitter symbols to be transmitted based on a message to be sent and feedback received from the receiver and transmitting the symbols; generating (304) by the receiver a predicted message based on the received symbols, evaluating (306) the predicted message based on a criterion and providing (312), utilising an algorithm with trainable weights, feedback symbols as a response to the transmitter if the evaluation indicates the predicted message is not acceptable.

16 Claims, 4 Drawing Sheets

(56) References Cited

FOREIGN PATENT DOCUMENTS

| EP | 3418948 A1 | * | 12/2018 | ........... G06N 3/0454 |
|---|---|---|---|---|
| FR | 2875093 A1 | | 3/2006 | |
| WO | 2019/149574 A1 | | 8/2019 | |

OTHER PUBLICATIONS

Office Action dated Sep. 14, 2022, corresponding to Indian Patent Application No. 202247030211.
International Search Report and Written Opinion dated Jul. 30, 2020 corresponding to International Patent Application No. PCT/EP2019/079805.
Baris Goektepe et al., "Subcode-Based Early HARQ for 5G," 2018 IEEE International Conference on Communications Workshops (ICC Workshops), IEEE, May 20, 2018, pp. 1-6, XP033369802.
Nils Strodthoff et al., "Machine Learning for Early HARQ Feedback Prediction in 5G," 2018 IEEE Globecom Workshops (GC WKSHPS), IEEE, Dec. 9, 2018, pp. 1-6, XP033519181.
O'Shea et al., "An introduction to deep learning for the physical layer", IEEE Transactions on Cognitive Communications and Networking, vol. 3, No. 4, Dec. 2017, pp. 563-575.
Khosravirad et al., "HARQ Enriched Feedback Design for 5G Technology", IEEE 84th Vehicular Technology Conference (VTC-Fall), Sep. 18-21, 2016, 5 pages.
Kim et al., "DeepCode: Feedback codes via deep learning", arXiv, Jul. 2, 2018, pp. 1-24.
Office action received for corresponding Chinese Patent Application No. 201980101912.9, dated Nov. 29, 2024, 4 pages of office action and 4 pages of translation/summary available.

* cited by examiner

APPARATUSES AND METHODS FOR PROVIDING FEEDBACK

TECHNICAL FIELD

The exemplary and non-limiting embodiments of the invention relate generally to communications.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

Hybrid Automatic Repeat Request (HARQ) is an error-control method for data transmission which combines standard Automatic Repeat Request (ARQ) with error-correcting codes. ARQ is a process where each message is transmitted along with a short error-detecting code. If the receiver detects an error in the message, it can either send a negative-acknowledgement to the transmitter or just choose not to send an acknowledgement, depending on the implementation. The transmitter then sends the exact same message again. The use of error-correcting codes in HARQ allows the receiver to correct a certain number of errors in a received message.

One drawback of HARQ is that the feedback sent by the receiver is only binary. When an error is detected in a received message, the receiver does not send any information to the transmitter apart from a possible negative-acknowledgement.

BRIEF DESCRIPTION

According to an aspect of the present invention, there are provided method of claim 1.

According to an aspect of the present invention, there are provided apparatuses of claims 10 and 11.

One or more examples of implementations are set forth in more detail in the accompanying drawings and the description below. Other features will be apparent from the description and drawings, and from the claims. The embodiments and or examples and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A), enhanced LTE (eLTE), or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
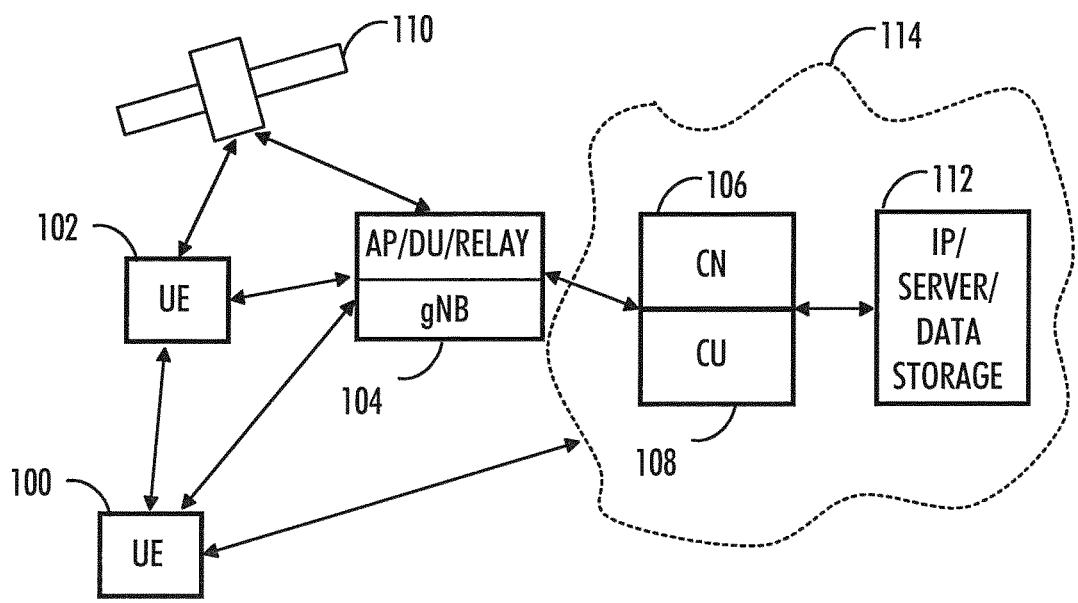
FIG. 1 illustrates a general architecture of an exemplary communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node, a distributed unit or an (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The core network further comprises a Core Access and Mobility Management Function, AMF, a Session Management Function, SMF, which is responsible for subscriber sessions, and User Plane Function, UPF.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) or a layer 2 relay (Integrated Access and Backhaul) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user device may also be a device having capability to operate utilizing enhanced machine-type communication (eMTC). The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, perhaps more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and mobile edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus, they are designed together and interworking between the units is easy. The interface between CU and DU is currently being standardized by 3GPP and it is denoted F1 interface. Therefore, in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

Figure 2:
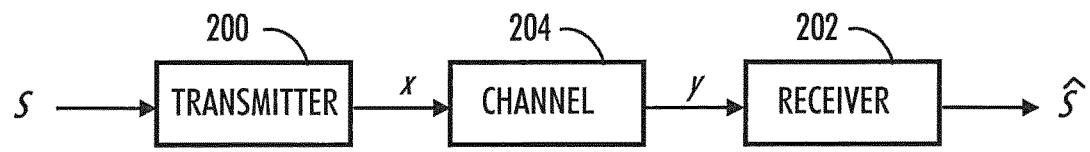
FIG. 2 illustrates an example of a simple communication system.

FIG. 2 illustrates an example of communication system in a simple form. The system comprises a transmitter 200, a receiver 202 and a channel 204 between the transmitter and the receiver. One way of interpreting a communication system is to implement it as an autoencoder. An autoencoder-based communication system implements the transmitter 200, channel 204, and receiver 202 as a single Neural Network (NN), which aims to reconstruct its inputs at its outputs. In an embodiment, the transmitter 200 may be implemented as a transmitter neural network and the receiver 202 as a receiver neural network. The channel 204 may also be implemented as a neural network. In general, an algorithm with trainable parameters may be used as well. The communication system of FIG. 2 may be implemented as an autoencoder in a following manner: the transmitter 200 encodes a message s from a finite discrete set into a finite-length vector of channel symbols denoted by x and transmits x to the channel 204. The receiver 202 takes as input from the channel a finite-length vector of samples denoted by y and generates a prediction of the sent messages denoted by ŝ. A channel model, which generates probability density function y~Pr(y|x), may be implemented as non-trainable layers between the transmitter and the receiver. If the channel model is differentiable, then the end-to-end system can be trained by backpropagation, using stochastic gradient descent, SGD, or a variant, for example.

As mentioned, one drawback of HARQ is that the feedback sent by the receiver is only binary. When an error is detected in a received message, the receiver does not send any information to the transmitter apart from a possible negative-acknowledgement. In an autoencoder-based communication system the system may be trained to send and receive a more informative feedback, thus increasing the quality of service of the system.

Figure 3:
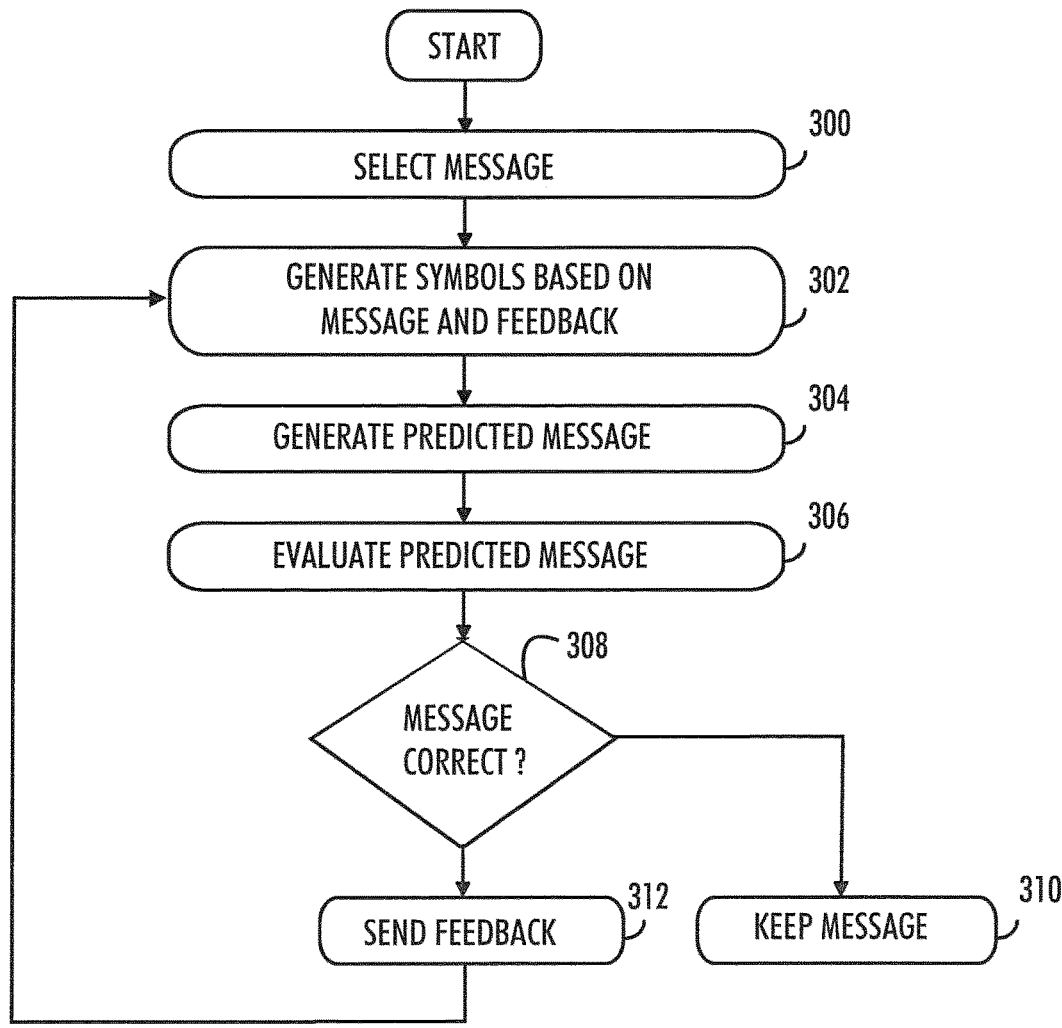
FIG. 3 is a flowchart illustrating an example of the operation of the a communication system.

FIG. 3 is a flowchart illustrating an example of the operation of a communication system of FIG. 2 implemented as an autoencoder-based communication system.

In step 300, a message to be transmitted is selected. In an embodiment, the message s is drawn from a set S containing all possible messages that may be sent over a channel.

In step 302, the message s and the previous feedback from the receiver are fed to the transmitter which generates symbols x to be transmitted based on the message s and the feedback. At the first iteration, when the message is transmitted for the first time, the transmitter has not received any feedback and the feedback value is set to 0. The transmitter then transmits the symbols to the channel.

In step 304, the receiver receives the symbols y from the channel and generates or decodes a corresponding predicted message ŝ.

In step 306, the predicted message ŝ is evaluated at the receiver by an evaluator function. In an embodiment, an evaluation value e is obtained.

In step 308, if the evaluation value is good enough, then the predicted message ŝ may be taken as the final decoded message 310. Otherwise, the receiver generates utilising an algorithm with trainable weights feedback symbols as a response to the transmitter for the next iteration and transmits 312 the response.

The transceiver receives the feedback, generates new symbols based on the message to be sent and the feedback symbols and transmits the message in step 302. The transmitter thus transmits the same information as on the previous iteration round but the generated symbols are different due to the received feedback.

Figure 4:
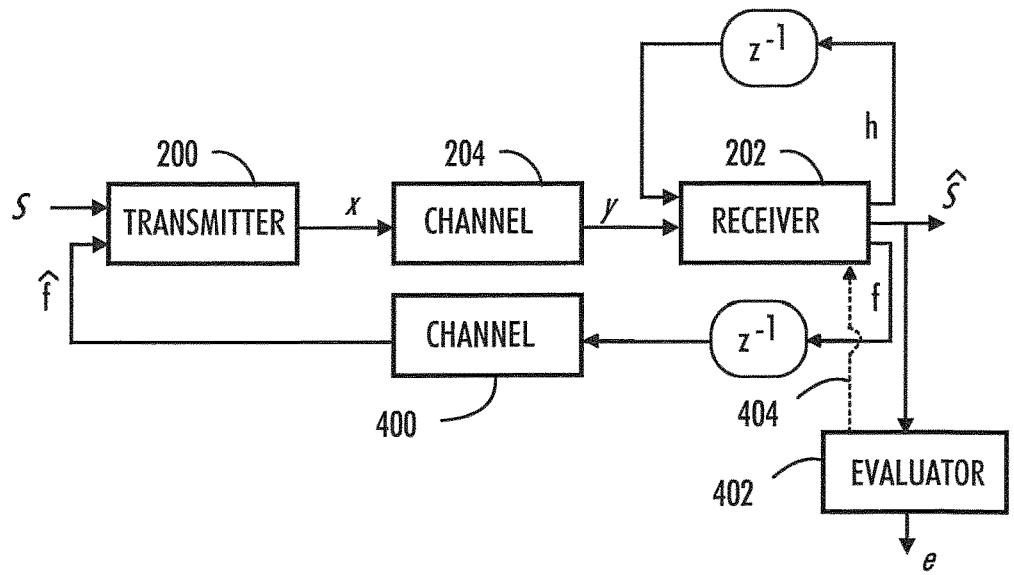
FIG. 4 illustrates an example of a simple communication system implemented using an autoencoder.

FIG. 4 illustrates an example of the communication system of FIG. 2 when implemented as an autoencoder based communication system. The figure shows transmitter 200, receiver 202, forward channel 204, feedback channel 400 and evaluator 402. The evaluator 402 has here shown outside the receiver 202, although it may also be a part of the receiver. In FIG. 4, $z^{-1}$ denotes delay.

The transmitter 200 and the receiver 202, may at least partly be implemented as algorithms or neural networks comprising trainable parameters or weights $\theta_T$, $\theta_R$.

The transmitter neural network $T_{\theta_T}$ with trainable parameters $\theta_T$ may be described by mapping $$T_{\theta_T}:(s,\tilde{f}_{t-1}) \in \mathcal{S} \times \mathbb{C}^{n_f} \to x_t \in \mathbb{C}^{n_m},$$

where s is the message to be sent, $\tilde{f}_{t-1}$ is the vector of feedback symbols received by the transmitter from the receiver, $n_m$ and $n_f$ are the number of channels used to transmit the message and the feedback, respectively, and $x_t$ is the vector of message symbols the transmitter sends over the channel. The feedback symbol vector $\tilde{f}_{t-1}$ is a vector of complex baseband symbols.

The receiver neural network $R_{\theta_R}$ with trainable parameters $\theta_R$ may be described by mapping $$R_{\theta_R}:(y_t,h_{t-1}) \in \mathbb{C}^{n_m} \times \mathcal{H} \to (\hat{s}_t,f_t,h_t) \in \mathcal{S} \times \mathbb{C}^{n_f} \times \mathbb{R}^h$$

where $y_t$ is the vector of symbols received by the receiver, $\hat{s}$ is the decoded message, and $f_t$ is the vector of feedback symbols sent by the receiver. The vector $h_t$ can be interpreted as a receiver's internal state and takes value in $\mathbb{R}^h$. $\mathbb{C}$ and $\mathbb{R}$ denote the sets of complex and real numbers.

As mentioned, the forward channel 204 from the transmitter to the receiver, a channel model which generates $y_t \sim \Pr(y_t|x_t)$ may be implemented as a neural network or an algorithm with trainable parameters. Likewise, on the opposite direction 400, a channel model which generates $\tilde{f}_{t-1} \sim \Pr(\tilde{f}_{t-1}|f_t)$ may also be also implemented as a neural network or an algorithm with trainable parameters.

The evaluator 402 may be modelled by a function E: $\hat{s}_t \in \mathcal{R} \to e \in \mathcal{S}$ which evaluates the predicted message $\hat{s}_t$. If evaluation value e is good enough, then the predicted message $\hat{s}_t$ may be taken as the final decoded message.

Otherwise, feedback $f_t$ is to be transmitted to the transmitter as an input for the next iteration. The evaluator may inform 404 the receiver that feedback is to be sent to the transmitter.

The function E may depend on the messages sent. In an embodiment, when the messages comprise integers from a finite set, then $\hat{s}_t$ may be a probability vector over the possible integers. The evaluator may then be a threshold, and the integer having the highest probability of having been sent is taken as the message if the probability is over the threshold.

In an embodiment, the messages may be sequences of bits encoded with a cyclic redundancy check, CRC. Now the evaluation may be a decoding algorithm checking if the CRC matches the sequence.

In an embodiment, the messages to be sent may be multimedia data. In this case, the evaluator may be a function that evaluates the quality of the received data.

Figure 5:
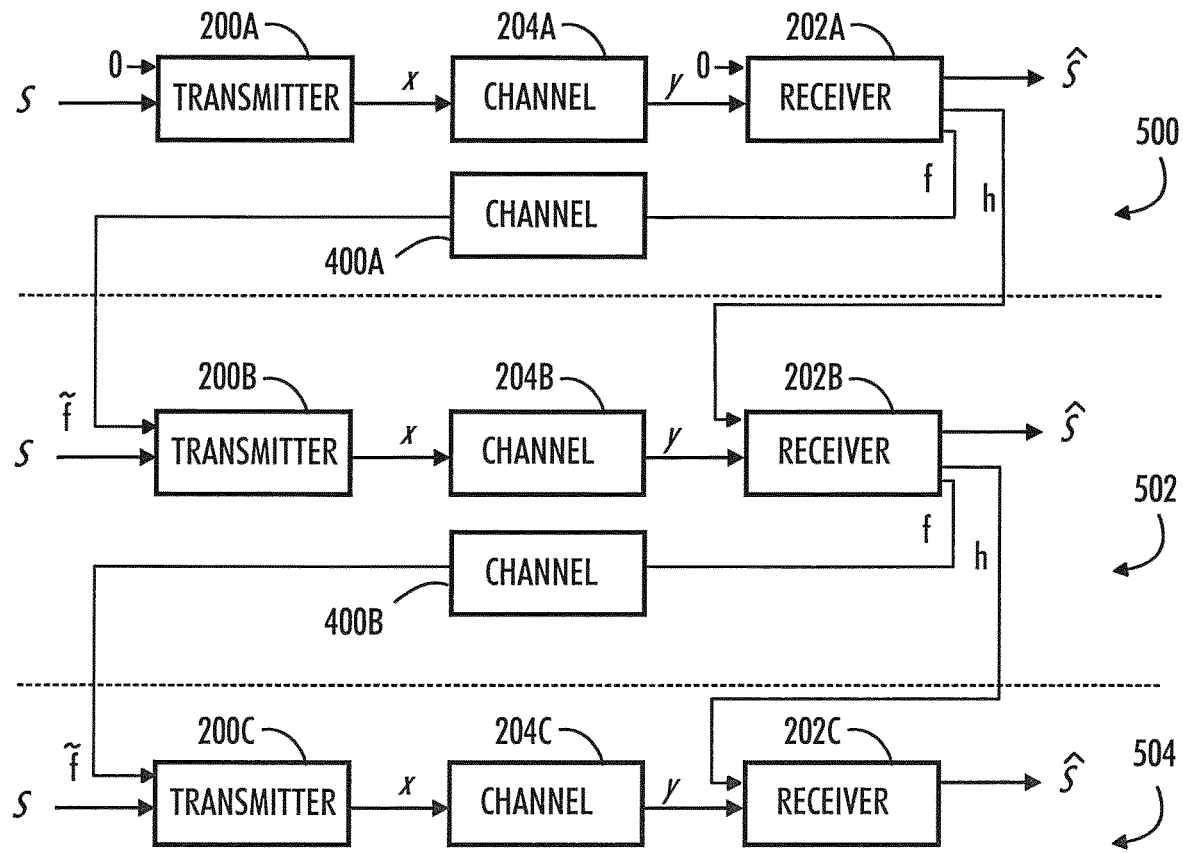
FIG. 5 illustrates an example of an unfolded autoencoder.

In an embodiment, the transmitter neural network and the receiver neural network are trained to produce correct feedback and to react to the feedback. The autoencoder-based communication system may be viewed as a recurrent neural network which can be unfolded. Unfolding means here a technique where the multiple iteration rounds through the network at multiple time steps are unfolded into a single larger neural network, where the weights of the network are shared between every transmitter and receiver. FIG. 5 illustrates an example of an unfolded autoencoder of FIG. 4, where the number of iterations of times steps are assumed to be three (time steps t=0,1,2).

As before, the message to be transmitted is s, the symbols to be transmitted are denoted as x and they are based on the message s and the feedback from the receiver. At the first iteration, when the message is transmitted for the first time, the transmitter has not received any feedback and the feedback value is set to 0. Symbols arriving to the receiver through the channel are denoted as y, feedback generated by the receiver f, feedback received by the receiver through the channel is denoted with $\tilde{f}$ and h is the internal state of the receiver. The unfolded autoencoder comprises the first transmission 500 (t=0), and two successive transmissions 502 (t=1), 504 (t=2).

On the first iteration round or first transmission, 500 (t=0), there are transmitter 200A, forward channel 204A, receiver 202A and feedback channel 400A.

On the second iteration round or transmission, 502 (t=1), there are transmitter 200B, forward channel 204B, receiver 202B and feedback channel 400B.

Correspondingly, on the third iteration round or transmission, 504 (t=2), there are transmitter 200C, forward channel 204C, receiver 202C and feedback channel 400C.

Figure 6:
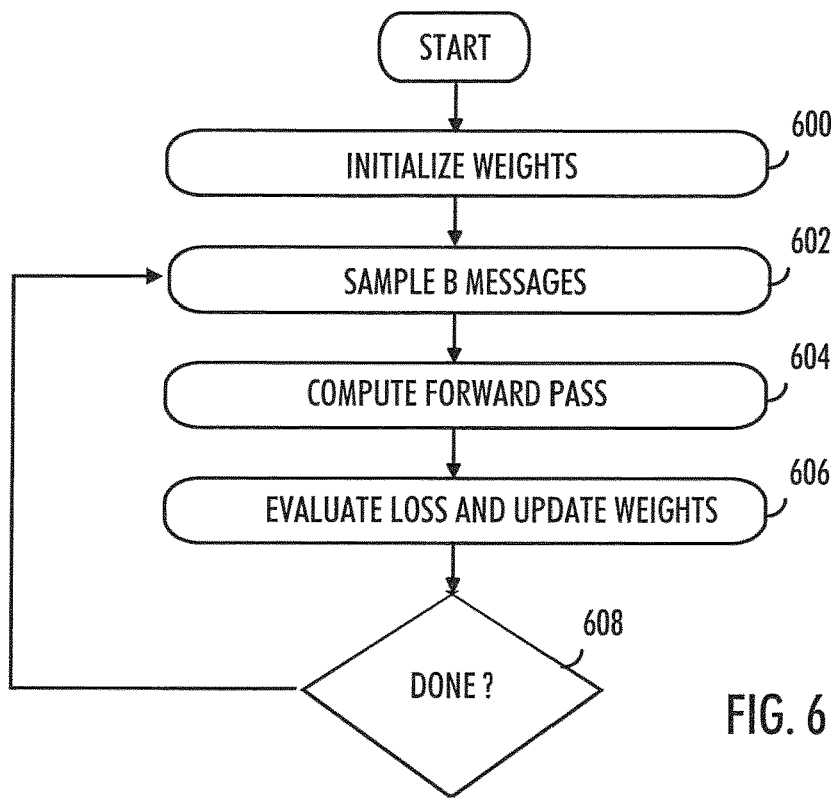
FIGS. 6 and 7 are flowcharts illustrating examples of training a neural network.

FIG. 6 is a flowchart illustrating an embodiment. The flowchart describes training of the transmitter neural network and the receiver neural network (or training of algorithms with trainable parameters). The steps of the flowchart may be performed by an apparatus configured to perform the training of the neural networks. In an embodiment, regular backpropagation with Stochastic Gradient Descent, SGD, or a variant may be utilised in the training.

In step 600 of FIG. 6, the number B of messages to be used at each iteration round is selected and random initial weights are selected for transmitter and receiver neural networks, the same weights being used on each iteration round. Thus the same weights are shared between every transmitter (200A, 200B, 200C), and similarly between every receiver (202A, 202B, 202C), in the unfolded architecture of the autoencoder.

In step 602 of FIG. 6, a given number B of messages $\{s_i \in S\}_{i=1,\ldots,B}$ is sampled for transmission.

In step 604 of FIG. 6, a forward pass through the autoencoder, i.e predicted message, feedback and receiver's internal state $\{\hat{s}_{i,t}, f_{i,t}, h_{i,t}\}_{i=1,\ldots,B, t=0,1,2}$ for each message are computed through the unfolded autoencoder (for each iteration round 500, 502, 504);

In step 606 of FIG. 6, the weights ($\theta_T$, $\theta_R$) for transmitter and receiver neural networks are updated based on a loss function selected on the basis of the type of messages. In an embodiment, gradient descent (using SGD or a variant) is performed on the loss:

$$L(\theta_T, \theta_R) = \frac{1}{B}\sum_{i \in B}\sum_{t=0,1,\ldots,(I-1)} \text{loss}(\hat{s}_{i,t}, s_{i,t})$$

where loss (•) is a loss function that depends on the nature of the messages sent. I is the number of iterations. For example, if the messages are images, then the loss function could be the Mean Squared Error (MSE) of the pixel values between the sent and the received images.

The three previous steps are repeated 608 a desired number of times to obtain weights for the transmitter and receiver neural networks. The number of iteration rounds in the training may be fixed or it may be based on some criteria. For example, the training may be stopped after a given number of iterations or when the loss or a related performance metric (such as block error rate) have reached a given performance threshold.

Above, the number of messages B, learning rate and variant of SGD may be parameters of the training algorithm.

The evaluator 402 can be given or can be implemented as a trainable evaluator algorithm or a neural network. The evaluator neural network is trained in a similar manner like transmitter and receiver neural networks. In an embodiment, evaluator neural network is trained after training the transmitter and receiver neural networks. The evaluator neural network comprises trainable parameters $\theta_E$, i.e., $E_{\theta_E}$: $p_t \in \mathcal{P} \to e \in \mathcal{R}$. For a given transmitter, channel, and receiver, the training can also be done with regular backpropagation with SGD, or a variant.

Figure 7:
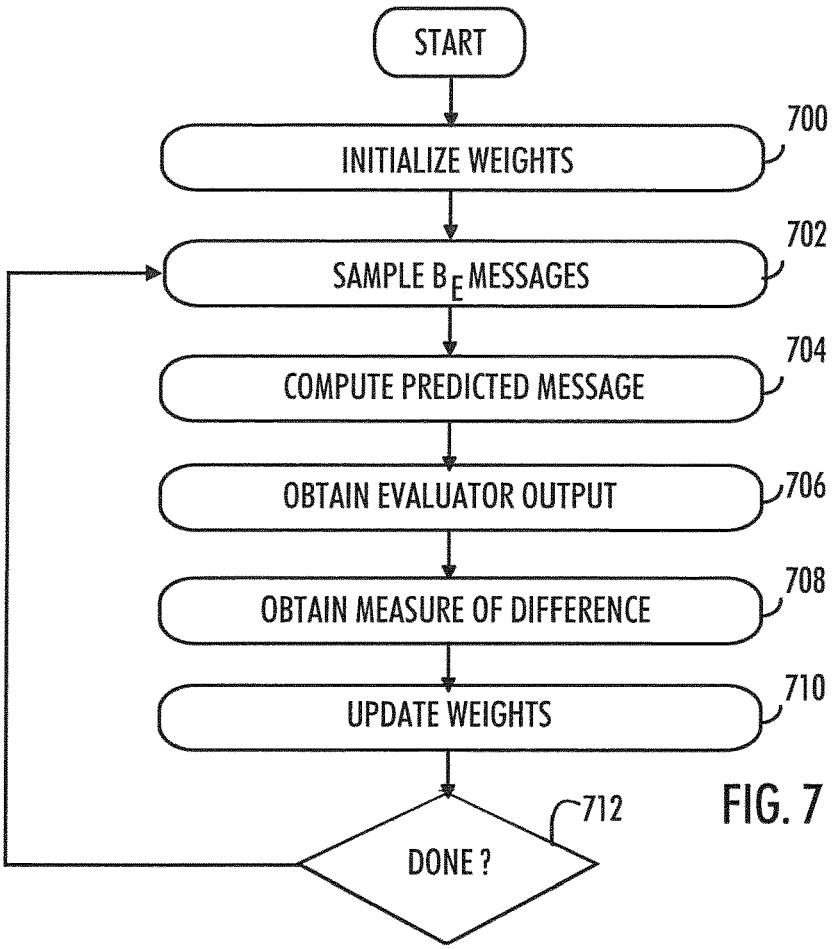

An example of the training of the evaluator neural network is illustrated in the flowchart of FIG. 7.

In step 700 of FIG. 7, the number $B_E$ of messages to be used at each iteration round is selected and random initial weights are selected for the evaluator.

In step 702 of FIG. 7, a given number $B_E$ of messages $\{s_i \in S\}_{i=1,\ldots,B_E}$ is sampled for transmission.

In step 704 of FIG. 7, a forward pass through the autoencoder to obtain predicted message $\{\hat{s}_i\}_{i=1,\ldots,B_E}$ for each message.

In step 706 of FIG. 7, a forward pass through the evaluator is computed to obtain $\{e_i\}_{i \in B_E}$ i.e the evaluator output.

In step 708 of FIG. 7, a measure of difference is calculated between the generated evaluation $\{e_i\}_{i \in B_E}$ and a true evaluation, such as a Peak Signal to Noise Ratio, PSNR, or Mean Squared Error, MSE, between s and ŝ.

In step 710 of FIG. 7, the weights ($\theta_E$) for the evaluator neural network are updated by performing a gradient descent (using SGD or a variant) on the measure of difference, the updating of weights utilising a loss function selected on the basis of the type of the measure. For example, if the measure of difference is the MSE, then the evaluator loss can be computed as:

$$L_E(\theta_E) = \frac{1}{B_E} MSE(e_i, PSNR(\hat{s}_i, s_i))$$

The three previous steps may be repeated 712 a desired number of times to obtain weights for the evaluator neural network. The stop criterion may be the same as in the case of training transmitter and receiver neural networks. The number of messages $B_E$, learning rate and variant of SGD may be parameters of the training algorithm.

Figure 8:
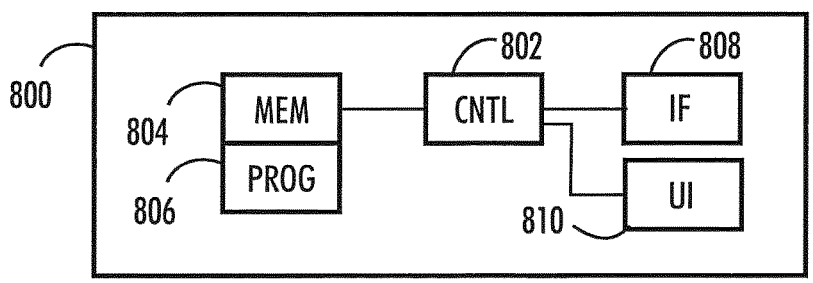
FIG. 8 illustrates an example of an apparatus.

FIG. 8 illustrates an embodiment. The figure illustrates a simplified example of an apparatus 800 applying embodiments of the invention. It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 800 of the example includes a control circuitry 802 configured to control at least part of the operation of the apparatus.

The apparatus may comprise a memory 804 for storing data. Furthermore the memory may store software 806 executable by the control circuitry 802. The memory may be integrated in the control circuitry.

The apparatus may comprise one or more interface circuitries 808, 810. The apparatus may comprise an interface 808 for connecting the apparatus to a network or communication system. The interface may provide a wired or wireless connection to the communication system. The apparatus may further comprise a user interface 810 realised with known methods. The interfaces may be operationally connected to the control circuitry 802.

The software 806 may comprise a computer program comprising program code means adapted to cause the control circuitry 802 of the apparatus to perform the embodiments described above and in the claims.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, the apparatus comprises means for utilising a receiver algorithm with trainable weights; means for controlling reception of symbols from a transmitter; means for evaluating the predicted message based on a criterion; means for providing, utilising an algorithm with trainable weights, feedback symbols as a response to the transmitter if the predicted message is not acceptable; and means for controlling transmission of the feedback symbols to the transmitter.

In an embodiment, the apparatus comprises means for utilising a receiver algorithm with trainable weights; means for controlling reception of symbols from a transmitter; means for evaluating the predicted message based on a criterion; means for providing, utilising an algorithm with trainable weights, feedback symbols as a response to the transmitter if the predicted message is not acceptable; and means for controlling transmission of the feedback symbols to the transmitter.

It will be obvious to a person skilled in the art that, as the technology advances, the inventive concept can be implemented in various ways. The invention and its embodiments are not limited to the examples described above but may vary within the scope of the claims.

The invention claimed is:

1. A retransmission method in a communication system, wherein the communication system comprises at least one transmitter and at least one receiver with a communication channel between the transmitter and the receiver, the method comprising of:
   utilizing in the transmitter a transmitter algorithm with trainable weights and in the receiver a receiver algorithm with trainable weights, wherein training of the weights of the transmitter and receiver algorithms includes:
      selecting initial weights for transmitter and receiver algorithms,
      sampling a given number of messages for transmission,
      computing a predicted message and feedback, for each message for each training iteration round,
      updating the weights for transmitter and receiver algorithms based on a loss function selected on the basis of the type of messages, and
      repeating sampling, computing, and updating operations a desired number of iteration rounds to obtain weights for the transmitter and receiver algorithms;
   generating by the transmitter symbols to be transmitted based on a message to be sent and feedback received from the receiver and transmitting the symbols;
   generating by the receiver a predicted message based on the received symbols, evaluating the predicted message based on a criterion and providing, utilizing an algorithm with trainable weights, feedback symbols as a response to the transmitter in response to the evaluation indicating that the predicted message is not acceptable.

2. The method of claim 1, wherein evaluating utilizes an algorithm with trainable weights and the training of evaluator algorithm with trainable weights includes:
   selecting initial weights for trainable weights of the evaluator algorithm;
   selecting a given number of messages;
   computing forward pass through transmitter, channel and receiver to obtain predicted message for each message;
   computing evaluation output utilizing the evaluator algorithm;
   updating the weights for evaluator algorithm by performing a gradient descent on a loss function selected on the basis of the type of the measure;
   repeating the three previous steps until a predetermined criterion fulfils to obtain weights for the evaluator algorithm.

3. The method of claim 1, further comprising:
   repeating the steps for training of the weights of the transmitter and receiver algorithms a predetermined number of times.

4. The method of claim 1, further comprising:
   repeating the steps for training of the weights of the transmitter and receiver algorithms until the loss function has reached a given threshold.

5. The method of claim 1, wherein the selected initial weights are random.

6. The method of claim 1, wherein the messages to be sent comprise sequences of bits encoded with a cyclic redundancy check, CRC, and wherein the evaluation comprises comparing bits of the predicted message to the CRC.

7. The method of claim 1, wherein the messages to be sent comprise multimedia data, and wherein the evaluation comprises evaluating the quality of the received message.

8. The method of claim 1, further comprising:
   updating the weights by performing gradient descent on the loss $$L(\theta_T, \theta_R) = \frac{1}{B}\Sigma_{i \in B}\Sigma_{t=0,1,\ldots,(I-1)}\text{loss}(\hat{s}_{i,t}, s_{i,t}),$$

where $\theta_T, \theta_R$ are transmitter and receiver weights, B is the number of messages, s and ŝ are the transmitted and predicted messages, I is the number of iteration rounds and loss (•) is a loss function selected based upon the type of messages.

9. A computer program embodied on a non-transitory computer-readable medium, said computer program comprising instructions for causing an apparatus of a communication system to perform the method steps of claim 1.

10. An apparatus, comprising:
- at least one processor; and
- at least one memory including computer program code;
- the at least one memory and the computer program code configured to, with the at least one processor, cause the apparatus at least to perform:
- utilizing a transmitter algorithm with trainable weights, wherein training of the weights of the transmitter algorithm includes:
  - selecting initial weights for transmitter algorithm,
  - sampling a given number of messages for transmission,
  - computing a predicted message and feedback, for each message for each training iteration round,
  - updating the weights for transmitter algorithm based on a loss function selected on the basis of the type of messages, and
  - repeating the three previous steps a desired number of iteration rounds to obtain weights for the transmitter algorithm;
- generating and transmitting symbols based on a message to be sent;
- receiving feedback symbols from a receiver;
- generating new symbols to be transmitted based on the message to be sent and the received feedback symbols, the new symbols being different than previously transmitted; and
- transmitting the new symbols.

11. The apparatus of claim 10, wherein the at least one memory and the computer program code are configured to, with the at least one processor, cause the apparatus further to perform:
- repeating the steps a predetermined number of times.

12. The apparatus of claim 10, wherein the at least one memory and the computer program code are configured to, with the at least one processor, cause the apparatus further to perform:
- repeating the steps until the loss function has reached a given threshold.

13. The apparatus of claim 10, wherein the at least one memory and the computer program code are configured to, with the at least one processor, cause the apparatus further to perform:
- selecting random initial weights.

14. The apparatus of claim 10, wherein the messages to be sent comprise sequences of bits encoded with a cyclic redundancy check, CRC, and wherein the evaluation comprises comparing bits of the predicted message to the CRC.

15. An apparatus, comprising:
- at least one processor; and
- at least one memory including computer program code;
- the at least one memory and the computer program code configured to, with the at least one processor, cause the apparatus at least to:
- utilize a receiver algorithm with trainable weights by
  - selecting initial weights for evaluator algorithm,
  - selecting a given number of messages,
  - computing forward pass through transmitter, channel and receiver to obtain predicted message for each message,
  - computing evaluation output utilizing the evaluator algorithm,
  - updating the weights for evaluator algorithm by performing a gradient descent on a loss function selected on the basis of the type of the measure, and
  - repeating the three previous steps until a predetermined criterion fulfils to obtain weights for the evaluator algorithm;
- control reception of symbols from a transmitter;
- generate a predicted message based on the received symbols;
- evaluate the predicted message based on a criterion;
- provide, utilizing an algorithm with trainable weights, feedback symbols as a response to the transmitter in response to the evaluation indicating that the predicted message is not acceptable; and
- control transmission of the feedback symbols to the transmitter.

16. The apparatus of claim 15, wherein the messages to be sent comprise multimedia data, and wherein the evaluation comprises evaluating a quality of the received message.

* * * * *